(12) United States Patent
Jostmeier et al.

(10) Patent No.: US 7,521,633 B2
(45) Date of Patent: Apr. 21, 2009

(54) DEVICE FOR GUIDING AT LEAST ONE LINE

(75) Inventors: Helmut Jostmeier, Oberrot b. Gaildorf (DE); Rainer Funk, Wüstenrot (DE)

(73) Assignee: Murrplastik Systemtechnik GmbH, Oppenweiler (DE)

( * ) Notice: Subject to any disclaimer, the term of this patent is extended or adjusted under 35 U.S.C. 154(b) by 420 days.

(21) Appl. No.: 10/578,427

(22) PCT Filed: Oct. 21, 2004

(86) PCT No.: PCT/EP2004/011897

§ 371 (c)(1),
(2), (4) Date: May 5, 2006

(87) PCT Pub. No.: WO2005/048432

PCT Pub. Date: May 26, 2005

(65) Prior Publication Data

US 2007/0144376 A1 Jun. 28, 2007

(30) Foreign Application Priority Data

Nov. 7, 2003 (DE) ................. 103 52 461

(51) Int. Cl.
*H02G 3/04* (2006.01)
(52) U.S. Cl. ............ 174/68.1; 174/480; 174/135; 174/97; 174/100; 248/68.1
(58) Field of Classification Search ............ 174/480, 174/68.1, 68.3, 135, 72 A, 97, 100; 248/68.1, 248/74.3; 439/207; 138/111
See application file for complete search history.

(56) References Cited

U.S. PATENT DOCUMENTS

| 5,054,944 | A | 10/1991 | Matsuyama |
| 5,322,480 | A | 6/1994 | Meier et al. |
| 5,332,865 | A | 7/1994 | Jensen |
| 6,491,535 | B1 * | 12/2002 | Buse ................. 439/215 |
| 6,846,990 | B2 * | 1/2005 | Kisu et al. ........... 174/138 E |
| 6,861,583 | B1 * | 3/2005 | Ryals et al. ........... 174/507 |
| 7,154,051 | B2 * | 12/2006 | Mathieu .............. 174/480 |

FOREIGN PATENT DOCUMENTS

| DE | 24 32 900 | 1/1976 |
| DE | 77 40 020 | 4/1978 |
| DE | 44 10 336 | 9/1995 |
| DE | 19523105 | 1/1997 |
| EP | 0 789 167 | 8/1997 |
| JP | 01 288588 | 11/1989 |
| JP | 06 078439 | 3/1994 |
| JP | 06-078439 | 11/1994 |

OTHER PUBLICATIONS

International Search Report—Application No. PCT/EP2004/011897.

* cited by examiner

*Primary Examiner*—Dhiru R Patel
(74) *Attorney, Agent, or Firm*—Collard & Roe, P.C.

(57) ABSTRACT

The invention relates to a device for guiding a power supply chain (30). Said device includes a distribution trough (4), which has a distribution surface (6) and lateral guides (8), for distributing the power supply chain (30). According to the invention, the power supply chain (30) includes at least one magnet (12, 16, 28), which enables said chain to be freely suspended, at least over sections of its length, in the distribution trough (4).

42 Claims, 9 Drawing Sheets

DEVICE FOR GUIDING AT LEAST ONE LINE

CROSS REFERENCE TO RELATED APPLICATIONS

Applicants claim priority under 35 U.S.C. §119 of German Application No. 103 52 461.4 filed Nov. 7, 2003. Applicants also claim priority under 35 U.S.C. §365 of PCT/EP2004/011897 filed Oct. 21, 2004. The international application under PCT article 21 (2) was not published in English.

BACKGROUND OF THE INVENTION

1. Field of the Invention

The invention relates to a distribution divice.

2. Description of Related Art

Lines, particularly electrical lines that serve to supply movable machines, are guided in a distribution trough, in order to protect them from damage. When the connected machine is moved, the lines are moved in the distribution trough, so that they or the sheaths that surround them drag along the inside surface of the trough. Wear of the line occurs due to the friction that occurs between the line and the inside surface of the distribution trough.

A distribution device for a line is known from U.S. Pat. No. 5,332,865, in which an upper stringer of the line is laid down onto a lower stringer in a distribution trough. A ribbon material is disposed between the upper stringer and the lower stringer, which keeps the upper stringer and the lower stringer at a distance from one another.

A power supply chain is known from EP 0 789 167 A1, which consists of a plurality of chain links that are connected with one another in articulated manner, in the interior of which at least one line is accommodated.

SUMMARY OF THE INVENTION

It is the task of the invention to further develop a device of the type stated initially, in such a manner that the line is exposed to less wear.

This task is accomplished, according to the invention, by means of a distribution device in accordance with the invention.

The invention is based on the idea of guiding the line or a sheath that protects it, in the distribution trough, in such a manner that it is guided at least partially without contact. At least at the sections that are guided without contact, the surface of the line, i.e. of the sheath that surrounds it, is not exposed to any friction wear, so that damage is avoided and the useful lifetime is extended. It is practical to guide those sections of the line that are moved relative to the distribution trough or to other sections of the line without contact. Preferably, at least one lower-side magnet that faces the distribution surface is guided with the line, and the distribution surface has at least one distribution-surface magnet, which is disposed in such a manner that it repels the lower-side magnet as it approaches. In the region of the magnets, the line, i.e. the sheath that surrounds it, is suspended above the distribution surface, and this is particularly advantageous when the line is being pulled through the distribution trough. An advantageous further development provides that at least one lateral magnet facing the lateral guides is guided with the line, and that the lateral guides have at least one lateral-guide magnet, in each instance, which is disposed in such a manner that it repels the lateral magnet as it approaches. In this case, friction wear caused by being dragged along the lateral guides is also prevented, at least in the region of the magnets.

It is practical if the line can be folded in the distribution trough, in such a manner that a first section can be laid down with its lower side that faces the distribution surface, above an upper side, facing away from the distribution surface, of a second section connected with the first by means of a bent section. This allows greater displacement paths, at the same length of the line. In this case, it is preferred that at least one upper-side magnet is guided with the upper side of the second section as well as the lower side of the first section, in each instance, whereby a magnetic pole of the upper-side magnet on the first section faces a similarly named pole of the upper-side magnet on the second section, so that the first section can be held suspended, at least over part of its length, above the second section. In this way, alternatively or supplemental to the aforementioned measures, friction wear caused by dragging of the first section on the second section, i.e. of the sheath that encloses the first section on the sheath that encloses the second section, is also avoided. Freely suspended mounting of the second section is then not necessarily required, since the latter is only laid down on the distribution surface, and not dragged along it. It is practical if several upper-side magnets are disposed along the first and the second section, at a distance from one another, in such a manner that magnetic poles along the first section face similarly named magnetic poles along the second section. The first section is thereby held suspended over a great part of its length, preferably over its entire length, and moved in this manner.

Accordingly, it is preferable if several lower-side magnets are disposed along the line, at a distance from one another, and several distribution-surface magnets are disposed on the distribution surface, at a distance from one another, in such a manner that magnetic poles along the line face similarly named magnetic poles on the distribution surface. In this way, the line, i.e. the sheath that encloses it, is held suspended above the distribution surface, either entirely or at least over a great part of its length. It is practical if several lateral-guide magnets are also disposed along the lateral guides, at a distance from one another, and several lateral magnets are disposed along the sides of the line that face the lateral guides, at a distance from one another, in such a manner that magnetic poles of the lateral-guide magnets face similarly named magnetic poles of the lateral magnets. In this way, contact with the lateral guides is avoided over a great part of the length or the entire length of the line, i.e. the sheath that encloses it. It is practical if the lateral-guide magnets are disposed on every lateral guide in two rows that run at a distance from one another, one above the other. In this manner, two sections of the line, i.e. of the sheath that encloses it, which sections are disposed one above the other, are guided at a distance from the lateral guides.

The lower-side magnets, the lateral magnets and/or the upper-side magnets can be disposed directly on the line. However, it is preferred that the line is disposed in a carrier that carries the lower-side magnets, the lateral magnets and/or the upper-side magnets. The carrier is preferably a sheath that encloses the line and protects it. In this connection, the magnets can be disposed on the outer surface of the carrier, within the carrier, or in accommodation openings in the outer surface of the carrier.

The carrier can be a plastic mass in which several lines are embedded. In this way, an entire cable package is guided in the distribution trough.

A particularly advantageous embodiment of the invention provides that the carrier is a power supply chain. Power supply chains, which are guided in a distribution trough and accommodate one or more lines, are exposed to great friction wear when they are moved. This holds true, for one thing, for the contact between the chain and the distribution surface. It holds true even more for the contact of the lateral links of the chain with the lateral guides of the distribution trough. Friction wear is greatest in the region of the chain where the upper stringer is laid down onto the lower stringer, and slides along the latter as the chain is moved, or slides along the lateral guides. At these points, at which a relative movement of components causes friction, contact-free guiding of the chain is most advantageous. The friction at these points is avoided by means of affixing lateral-guide magnets and/or distribution-surface magnets in the distribution trough, at the lateral guides and on the distribution surface, respectively, as well as lower-side magnets on the lower side of the chain that faces the distribution surface, upper-side magnets on the upper side of the lower stringer and on the lower side of the upper stringer, and/or lateral magnets on the sides of the power supply chain that face the lateral guides. Guiding of the chain at least partially without contact, and thereby without friction, has the further advantage that the energy consumption when moving the chain is reduced. Furthermore, greater accelerations and speeds can be achieved, as compared with an unsupported chain.

In this connection, it is practical if the lateral magnets are affixed to the lateral links of the chain. The lower-side magnets and the upper-side magnets can optionally be disposed on the lateral links or on the connection crosspieces that connect the lateral links. It is practical if a pair of upper-side magnets is disposed on every chain link, symmetrical to the center longitudinal plane, which magnets extend on both sides in the longitudinal direction of the chain link. In this connection, it is preferred that the upper-side magnets have elevations that run in their longitudinal direction and face away from the chain links. It is advantageous if the upper-side magnets of consecutive chain links are disposed at different distances from the sides of the links. In this connection, it is particularly preferred that in the case of each chain link, the elevations are disposed in the same manner as in the case of the $n^{th}$ following chain link. n is a natural number and preferably greater than or equal to 3. This results in lateral guiding of the upper stringer above the lower stringer, by means of which the upper stringer is held above the lower stringer in the case of minor disruptive influences, and does not deviate to the side. The lateral magnets can be replaced, at least in part, by rollers that roll along the lateral guides. When rollers are used, the lateral-guide magnets can be eliminated.

An advantageous further development of the invention provides that the distribution trough has a slide rail for laying down the upper stringer of the power supply chain, that at least one slide-rail magnet is disposed on the slide rail, and that at least one upper-side magnet is disposed on the lower side of the upper stringer that faces the slide rail, in such a manner that a magnetic pole of the upper-side magnet faces a similarly named magnetic pole of the slide-rail magnet. Preferably, several upper-side magnets are disposed on the power supply chain, at a distance from one another, and several slide-rail magnets are disposed on the slide rail, at a distance from one another, in such a manner that magnetic poles of the upper-side magnets face similarly named magnetic poles of the slide-rail magnets. The upper stringer can then be moved in the distribution trough in suspended manner, even beyond the end of the lower stringer. In this connection, it is practical if the upper-side magnets are the same magnets that also hold the upper stringer suspended above the lower stringer.

It is practical if the distribution trough is made of a non-magnetic material. This can be, for example, aluminum or an aluminum alloy. Plastic is also a possibility. A non-magnetic material has no disruptive influences on the magnets affixed to the distribution trough and to the line, i.e. its carrier. The lateral-guide magnets and the distribution-trough magnets can optionally be placed on the surface of the distribution trough, or inserted into openings in the distribution trough.

It is practical if all of the magnets used are permanent magnets and/or electromagnets.

BRIEF DESCRIPTION OF THE DRAWINGS

In the following, the invention will be explained in greater detail, using an exemplary embodiment shown schematically in the drawing. This shows:

FIG. 10 shows an embodiment in which a line is folded in the distribution through.

DETAILED DESCRIPTION OF PREFERRED EMBODIMENTS

Figure 1:
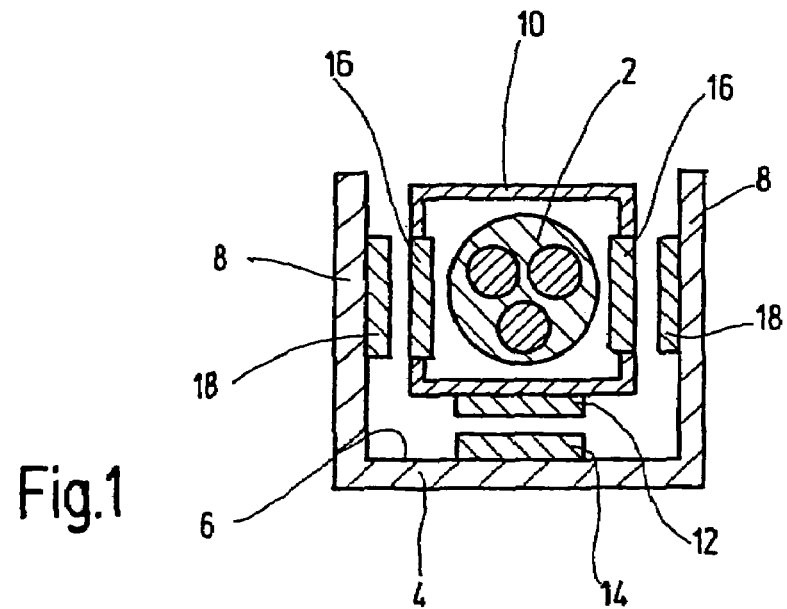
FIG. 1 to FIG. 3 a schematic representation of a device according to the invention, according to a first, a second, and a third exemplary embodiment, in cross-section.

According to a first exemplary embodiment (FIG. 1), a three-lead cable 2 is guided in a distribution trough 4 made of aluminum, which has a distribution surface 6 and lateral guides 8 that extend upward from the distribution surface 6. The cable 2 can be moved in its longitudinal direction, relative to the distribution trough 4. It is enclosed by a sheath 10, on the lower side of which, facing the distribution surface 6, a lower-side magnet 12 is disposed, which extends in the longitudinal direction of the cable 2, over a great part of the lower side of the sheath 10. Facing the lower-side magnet 12, a distribution-surface magnet 14 is disposed on the distribution surface 6, which magnet extends in the longitudinal direction of the distribution trough 4, over a great part of the length of the distribution surface 6. In this connection, a magnetic pole of the lower-side magnet 12 faces a similarly named magnetic pole of the distribution-surface magnet 14, so that the magnets 12, 14 repel one another as they approach one another. As a result, the sheath 10, with the cable 2 enclosed in it, is held suspended above the distribution surface 6. A lateral magnet 16 is disposed along sides of the cable 2, in the sheath 10, that face the lateral guides 8, in each instance, which magnet extends in the longitudinal direction of the cable 2. Two lateral-guide magnets 18 that extend in the longitudinal direction of the distribution trough 4 are affixed to the lateral guides 8, facing the lateral magnets 16, in such a manner that a magnetic pole of a lateral magnet 16 faces a similarly named magnetic pole of the lateral-guide magnet 18 assigned to the former. By means of the arrangement of the permanent magnets 12, 14, 16, 18, the sheath 10 that encloses the cable 2, is guided in the distribution trough 4 in contact-free manner.

Figure 2:
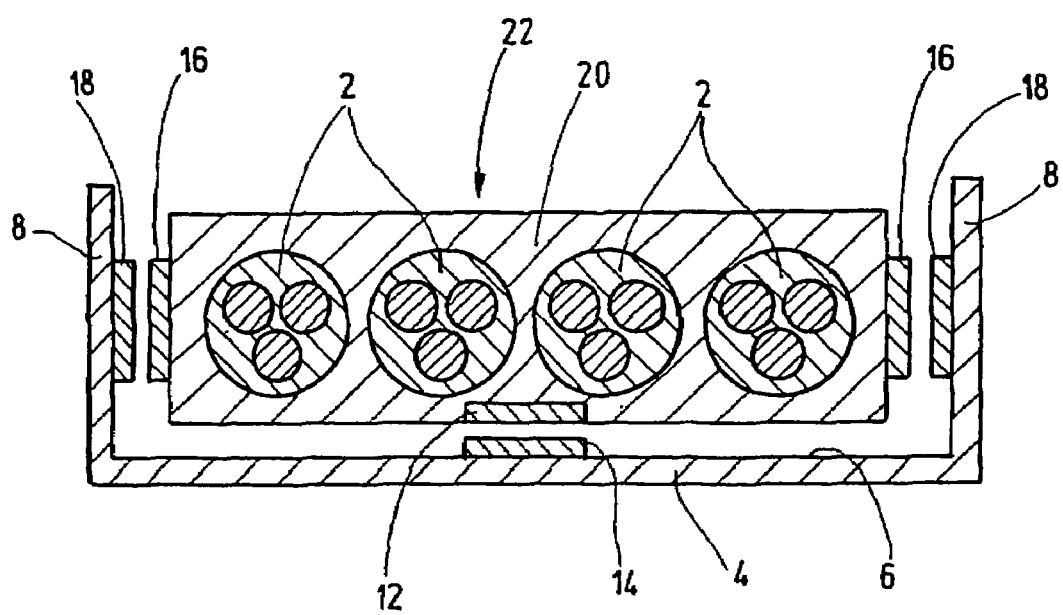

According to a second exemplary embodiment (FIG. 2), four three-lead cables 2 are embedded in a plastic mass 20 and form a cable package 22, which is guided in a distribution trough 4 and can be moved in its longitudinal direction, relative to the latter. The distribution trough 4 again has a distribution surface 6, as well as lateral guides 8 that project upward from the distribution surface 6. Along with the cables 2, several lower-side magnets 12 are disposed on the lower side of the cable package 22, at a distance from one another in the longitudinal direction. Several lateral magnets 16 are guided with the cables 2, on the sides of the cable package 22 that face the lateral guides 8, at a distance from one another, which magnets are disposed at a distance from one another in the longitudinal direction. Distribution-surface magnets 14 are disposed on the distribution surface 6, facing the lower-side magnets 12, at a distance from one another, and lateral-guide magnets 18 are disposed on the lateral guides 8, facing the lateral magnets 16, at a distance from one another. In this connection, magnetic poles of the distribution-surface magnets 14 face similarly named poles of the lower-side magnets 12, and magnetic poles of the lateral-guide magnets 18 face similarly named magnetic poles of the lateral magnets 16, so that the cable package 22 is suspended in the distribution trough 4, without contact.

Figure 3:
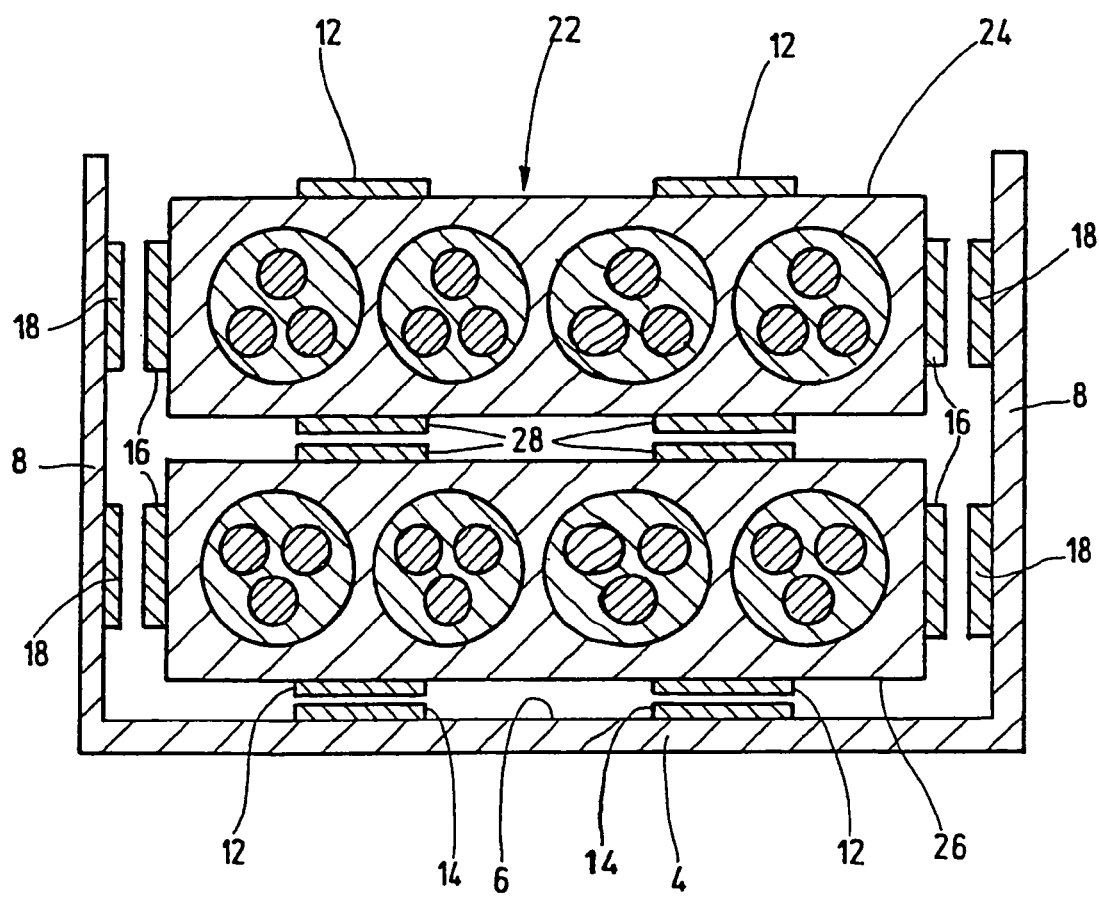

The third exemplary embodiment, according to FIG. 3, is a further development of the second exemplary embodiment. In this connection, the cable package 22 can be folded in the distribution trough 4 in such a manner that a first section 24 can be laid down above an upper side, facing away from the distribution surface 6, of a second section 26, which is connected with the first by way of a bent section. Here, only the first section 24 is movable relative to the distribution trough 4, while the second section 26 remains laid down above the distribution surface 6. In addition to two rows of lower-side magnets 12 disposed on its lower side, the second section 26 has two rows of upper-side magnets 28 on its upper side. Lying opposite these, two rows of upper-side magnets 28 are disposed on the lower side of the first section 24. In this connection, magnetic poles of the upper-side magnets 28 on the first section 24 are assigned to similarly named magnetic poles of the upper-side magnets 28 on the second section 26, so that the first section 24 is held suspended above the second section 26. The lateral guides 8 have two rows of lateral-guide magnets 18, disposed above one another, at a distance from one another, in order to achieve contact-free lateral guiding for the two sections 24, 26 of the cable package 22.

Figure 4:
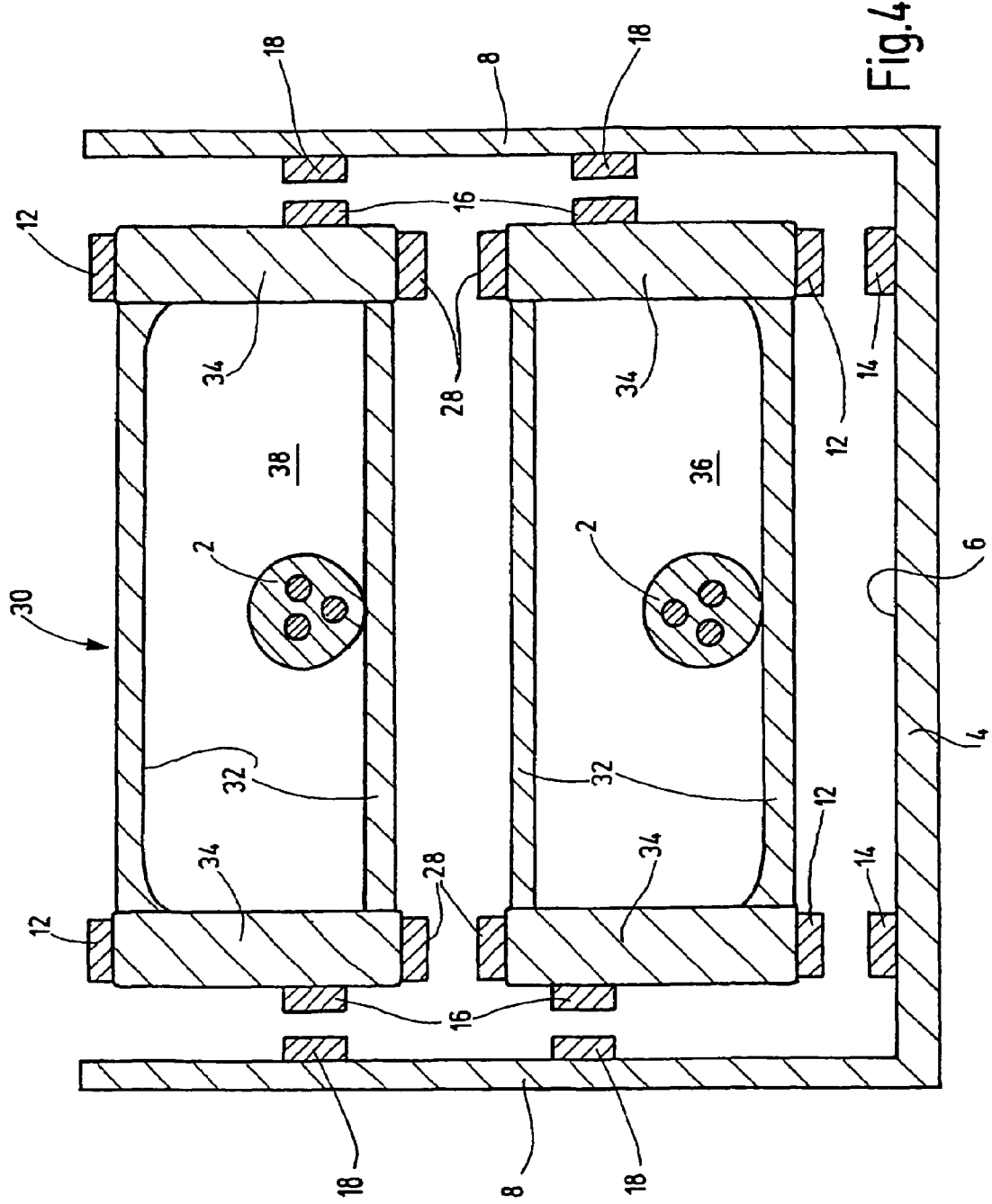
FIG. 4 a schematic representation of a device according to the invention, having a power supply chain, guided in a distribution trough, in cross-section.

In the case of the fourth exemplary embodiment shown in FIG. 4, a power supply chain 30 is guided in a distribution trough 4 having a distribution surface 6 and lateral guides 8. The power supply chain 30 has several chain links that are connected with one another, each of which has two lateral links 34 that are connected with one another by means of connection crosspieces 32 and run parallel to one another. A lower stringer 36 of the chain 30 is laid down above the distribution surface 6. An upper stringer 38 of the chain 30 is laid down above the lower stringer 36. In the power supply chain 30, a three-lead cable 2 is shown as an example of the various lines that can be guided in it. Only the upper stringer 38 is moved relative to the distribution trough 4, while the lower stringer 36 remains laid down above the distribution surface 6.

Upper-side magnets 28 are affixed to the lateral links 34, in each instance, on the upper side of the lower stringer 36 as well as on the lower side of the upper stringer 38 that faces the upper side of the lower stringer 36. In this connection, magnetic poles on the lower stringer 36 face similarly named magnetic poles on the upper stringer 38, so that the magnets on the lower stringer 36 and the magnets on the upper stringer 38 repel one another. The upper-side magnets 28 are disposed over the entire length of the power supply chain 30, so that the upper stringer 38 is held suspended above the lower stringer 36, and does not touch it. The lower stringer 36 is also held suspended above the distribution surface 6. For this purpose, lower-side magnets 12 are disposed on the lower side of the lower stringer 36, which faces the distribution surface 6, and distribution-surface magnets 14 are disposed on the distribution surface 6. These are affixed at a distance from one another, along the entire length of the power supply chain 30 and along the entire length of the distribution surface 6, respectively. Magnetic poles of the lower side magnets 12 face similarly named magnetic poles of the distribution-surface magnets 14, so that the lower-side magnets 12 and the distribution-surface magnets 14 repel one another as they approach one another.

If a section of the chain 30 is lifted from the distribution surface 6 and laid down above the lower stringer 36, by folding the chain as an upper stringer 38, the lower-side magnets 12 disposed on it point upwards and are on an upper side of the upper stringer 38.

Also in the fourth exemplary embodiment, lateral magnets 16 are disposed on the sides of the power supply chain 30 that face the lateral guides 8, whereby magnetic poles of the lateral magnets 16 face similarly named magnetic poles of lateral-guide magnets 18 disposed on the lateral guides 8. The lateral-guide magnets 18 are affixed to the lateral guides 8 in two rows that run above one another, so that the power supply chain 30 is guided in the distribution trough 4 without contact.

Figure 5:
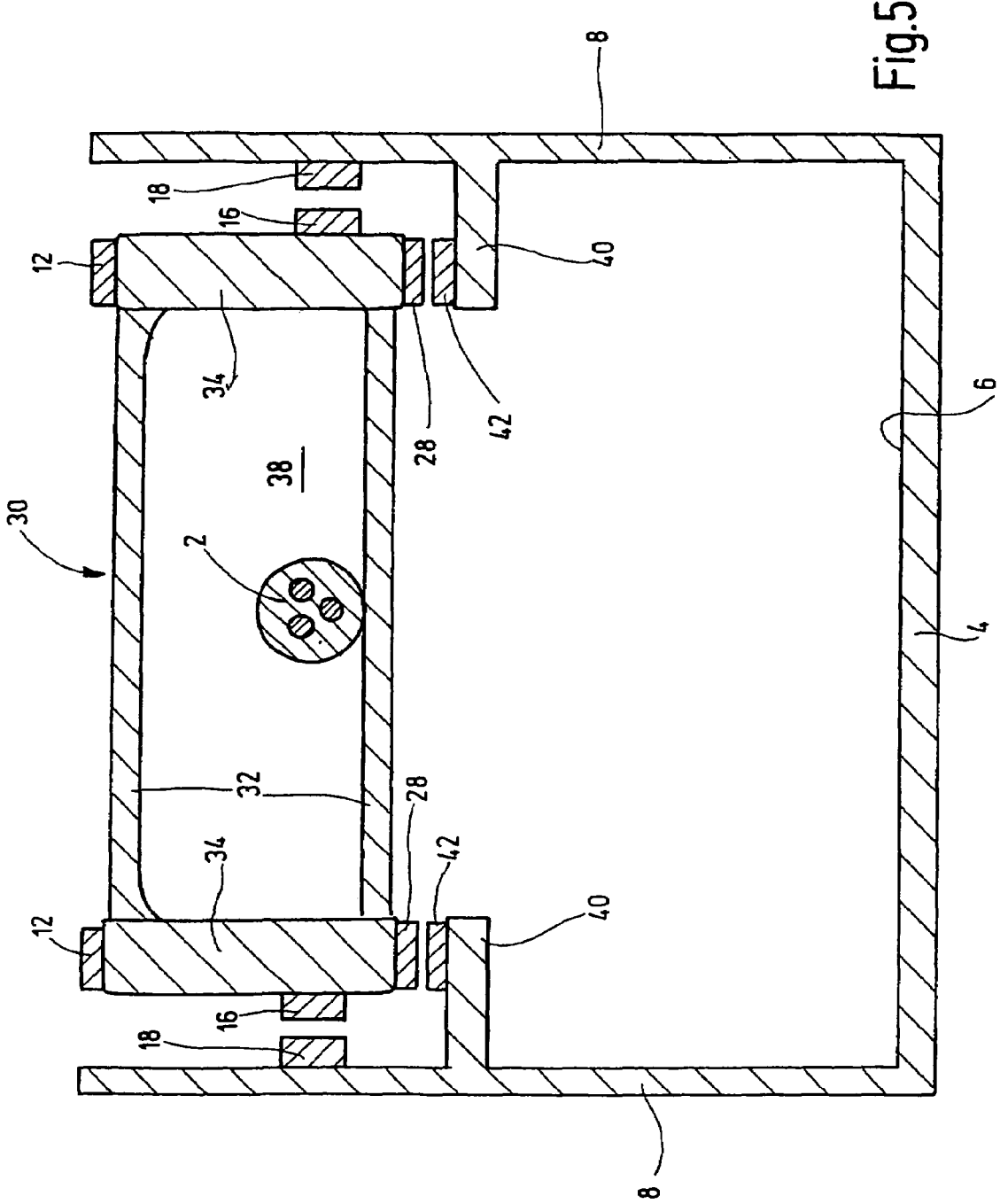
FIG. 5 another cross-section through the device according to the invention, according to FIG. 4.

If the upper stringer 38 is moved even farther beyond the end of the lower stringer 36, it can no longer be laid down onto it. For this purpose, the distribution trough 4 according to FIG. 5 has slide rails 40 in a region in which no lower stringer 36 is laid down in it, affixed to the lateral guides 8, above which the upper stringer 38 is laid down. A slide-rail magnet 42 is affixed to each of the slide rails 40, which magnet extends over the entire length of the slide rail 40. In this connection, a magnetic pole of the slide-rail magnet 42 faces similarly named magnetic poles of the upper-side magnets 28 on the lower side of the upper stringer 38, in each instance, so that the upper stringer 38 is held suspended in the distribution trough 4 even above the slide rails 40.

In the exemplary embodiments described above, the sheath 10, the cable package 22, and the power supply chain 30 are guided in the distribution trough 4 without contact over their entire length, in each instance. However, it is also possible to guide parts of the sheath 10, the cable package 22, or the power supply chain 30 that are moved only a little, or only at low speeds, not in contact-free manner. In particular, in order to achieve a simpler construction, the lower-side magnets 12 and distribution-surface magnets 14, or the lower row of the lateral-guide magnets 18, can be left out in the third and fourth exemplary embodiment. Likewise, it is possible to leave out both rows of the lateral-guide magnets 18 as well as the lateral magnets 16.

The representation of three-lead cables 2 should be viewed only as an example. The device according to the invention can also serve to guide other lines, particularly hydraulic or compressed air hoses.

Figure 6:
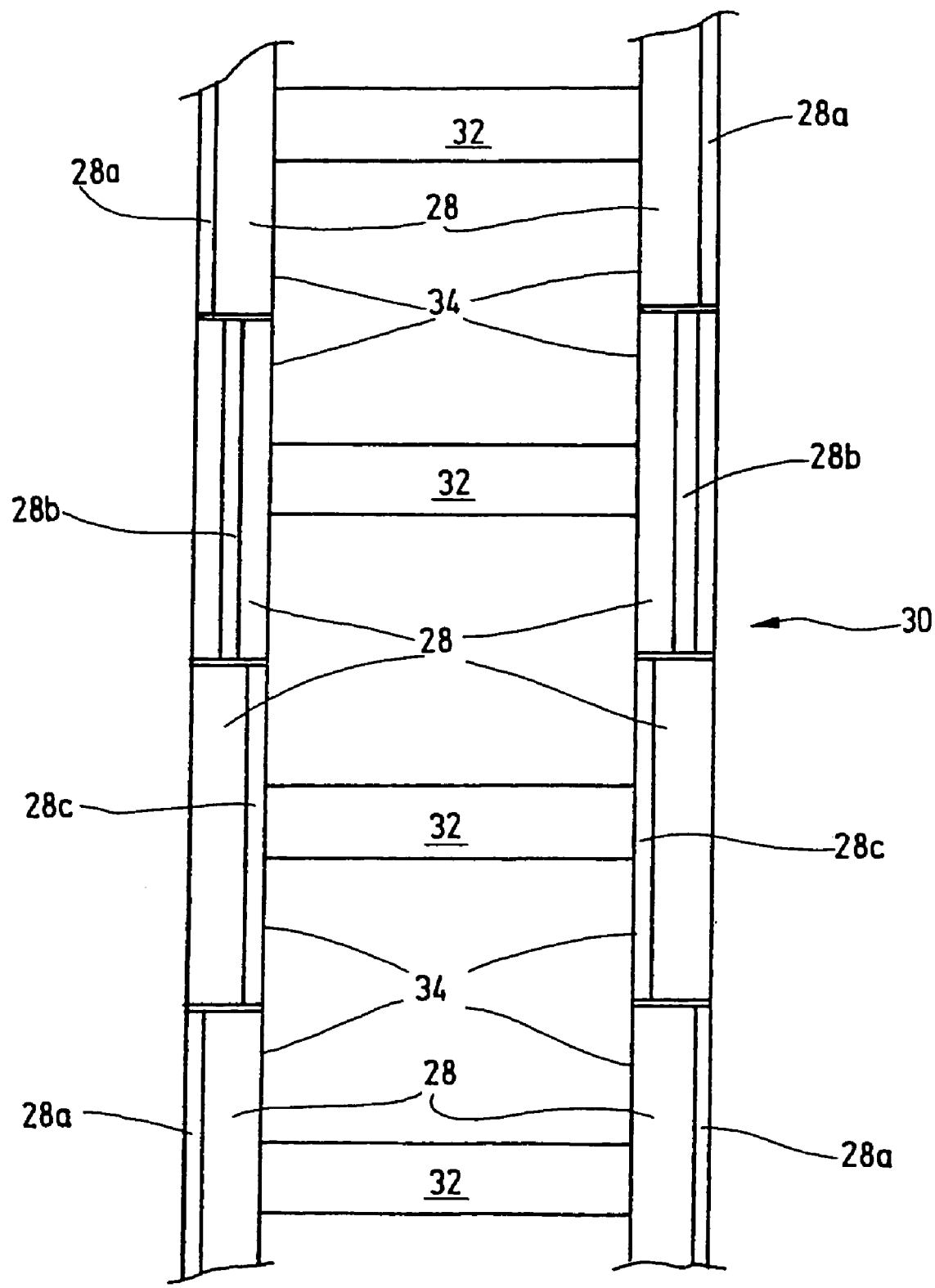
FIGS. 6 and 8 a schematic top view, in each instance, of a lower stringer of a power supply chain according to the invention.
Figure 7A:
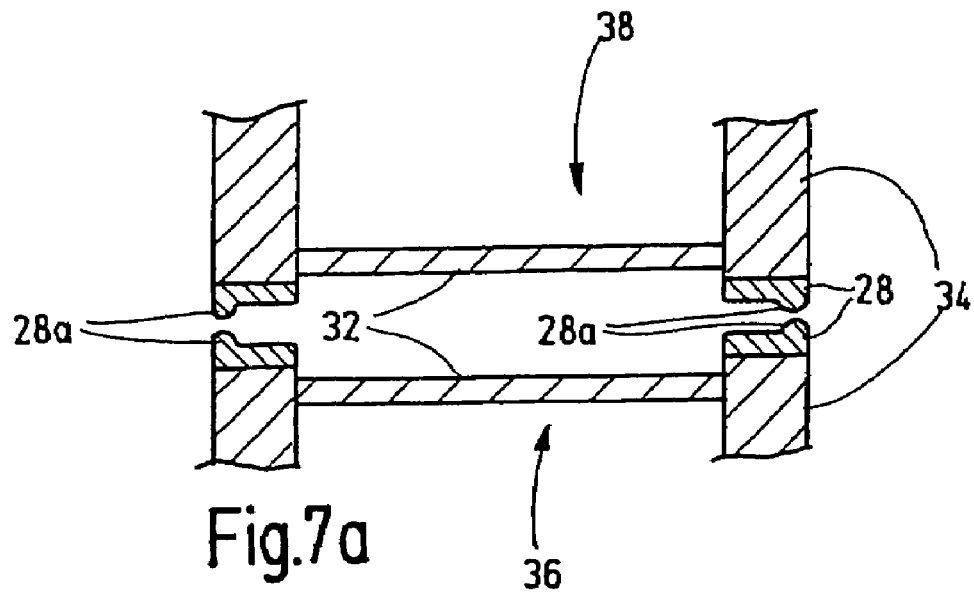
FIGS. 7a, b, c three schematic longitudinal sections through the power supply chain according to FIG. 6, with an upper stringer suspended above the lower stringer.

FIGS. 6 and 7a, b, c, show another exemplary embodiment, in which the upper stringer 38 of a power supply chain is held suspended above the lower stringer 36. In this exemplary embodiment, the upper stringer 38 is held above the lower stringer 36 even if minor disruptive influences occur, and does not deviate to the side, or deviates only insignificantly. As a result, it is fundamentally possible to do without a distribution trough having lateral guides. The power supply chain has a pair of upper-side magnets 28 on the upper side of its lower stringer 36, and thereby also on the lower side of its upper stringer 38, on each chain link, whereby magnetic poles on the lower stringer 36 always face similarly named magnetic poles on the upper stringer 38. These are affixed to the lateral links 34 that are connected with one another by means of connection crosspieces 32, and extend in the longitudinal direction of the chain link, in each instance. They are disposed symmetrical to the center longitudinal plane of the power supply chain. The upper-side magnets 28 have elevations 28a, 28b, 28c that run in the longitudinal direction of the magnets and face away from the chain links. These elevations are disposed at different distances from the sides of the chain links, in the case of consecutive chain links. In the exemplary embodiment shown here, the arrangement of the elevations repeats with every third chain link.

Figure 7B:
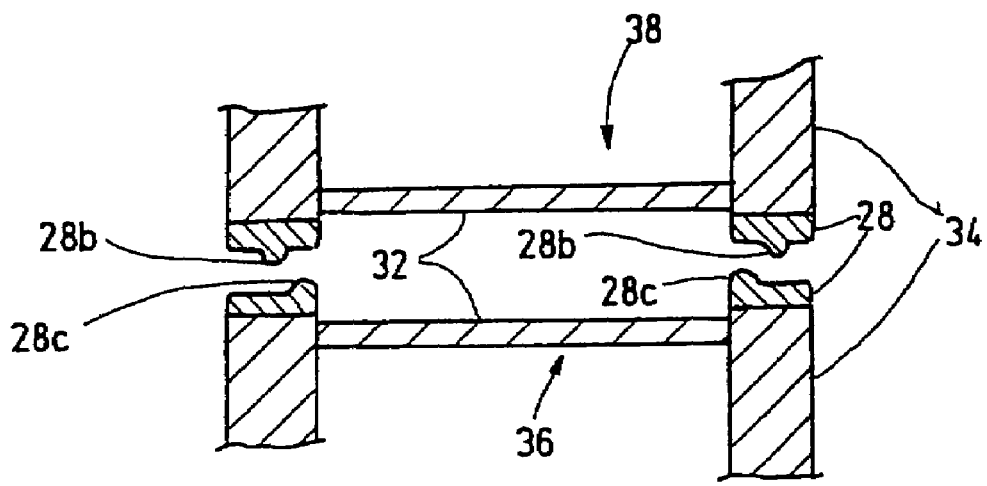
Figure 7C:
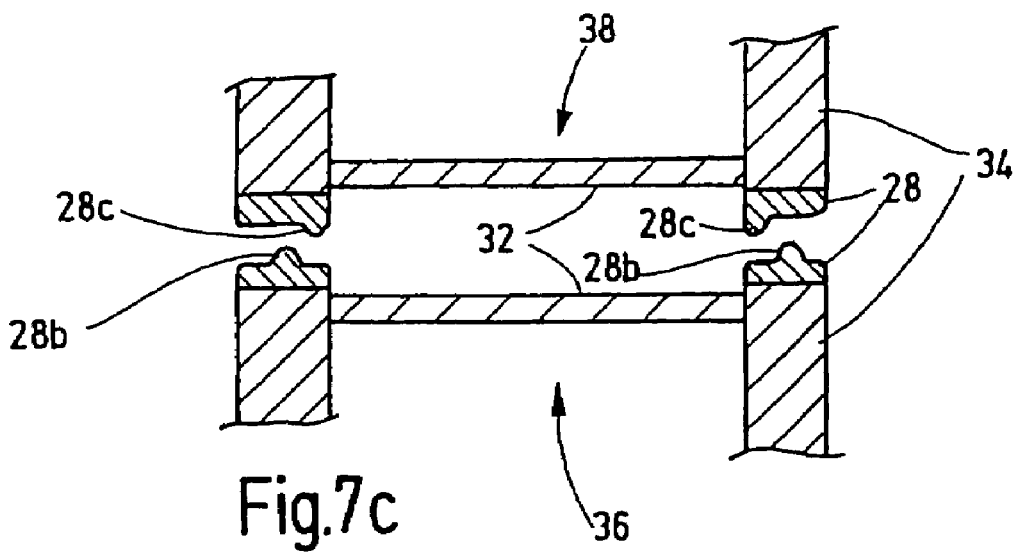

The arrangement of the elevations 28a, 28b, 28c has the result that the upper stringer 38 is stable with regard to lateral deflections with regard to the lower stringer 36. In the case of three consecutive chain link pairs of upper and lower stringer 36, 38, in the case of a first chain link pair, a chain link having the elevations 28a is suspended above a similar chain link at the outer edge of the lateral links 34 according to FIG. 7a. The horizontal components of the repulsion forces of the upper-side magnets 28 cancel one another out. In the case of the subsequent chain link pair (FIG. 7b), a chain link of the upper stringer 38, having elevations 28b disposed in the center of the lateral links 34, is suspended above a chain link of the lower stringer 36, having elevations 28c disposed on the inside of the lateral links 34. In the case of the subsequent chain link pair (FIG. 7c), a chain link of the upper stringer 38, having elevations 28c disposed on the inside of the lateral links 34 is suspended above a chain link of the lower stringer 36, having elevations 28b disposed in the center of the lateral links 34. In the two latter cases, a lateral deflection of the upper stringer 38 above the lower stringer 36 causes an elevation 28b, 28c on the upper stringer 38 to approach an elevation 28b, 28c on the lower stringer 36, in each instance, which counteracts slippage of the upper stringer 38 off the lower stringer 36. The upper stringer 38 is therefore always in a stable position, with regard to lateral deflections, above the lower stringer 36, over approximately two-thirds of its length.

Figure 9A:
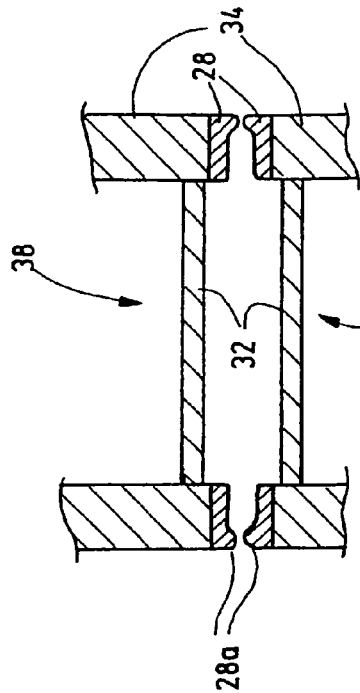
FIGS. 9a and b two schematic longitudinal sections through the power supply chain according to FIG. 8, with an upper stringer suspended above the lower stringer.
Figure 9B:
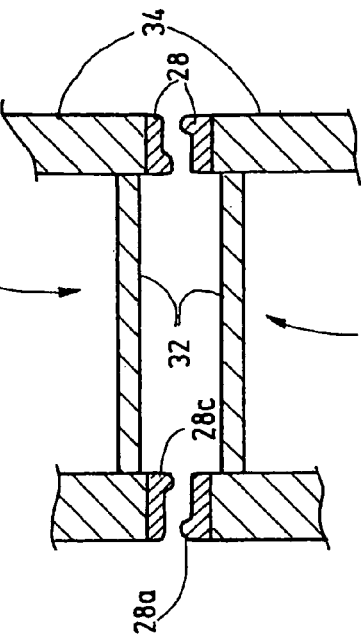
Figure 8:
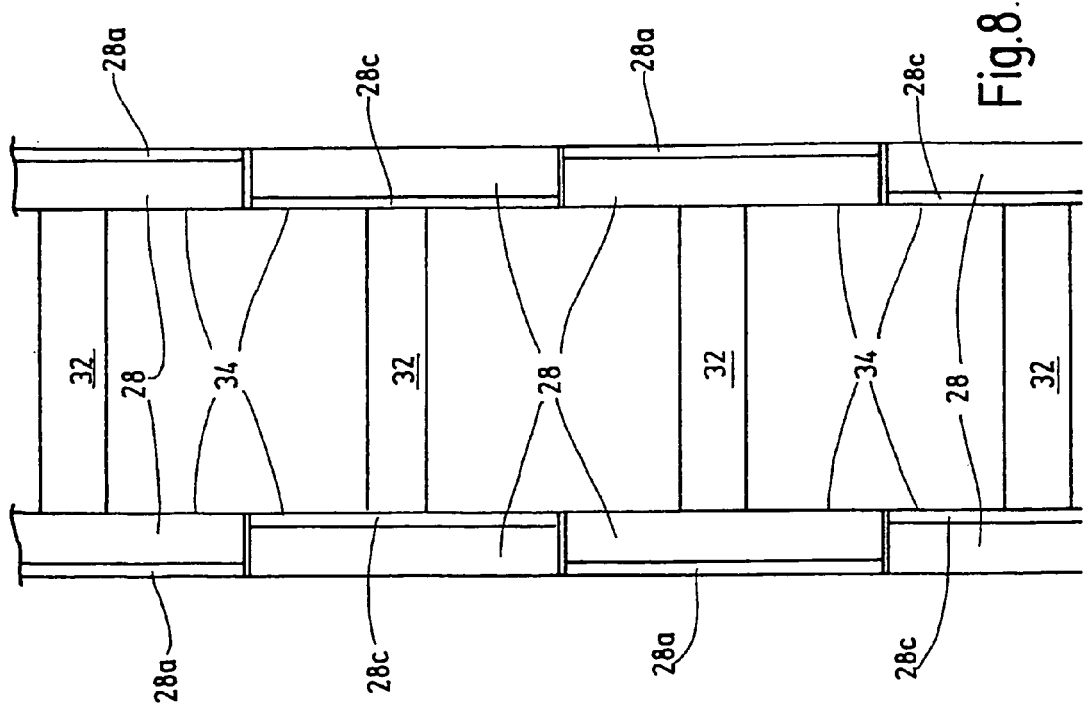
Figure 10:
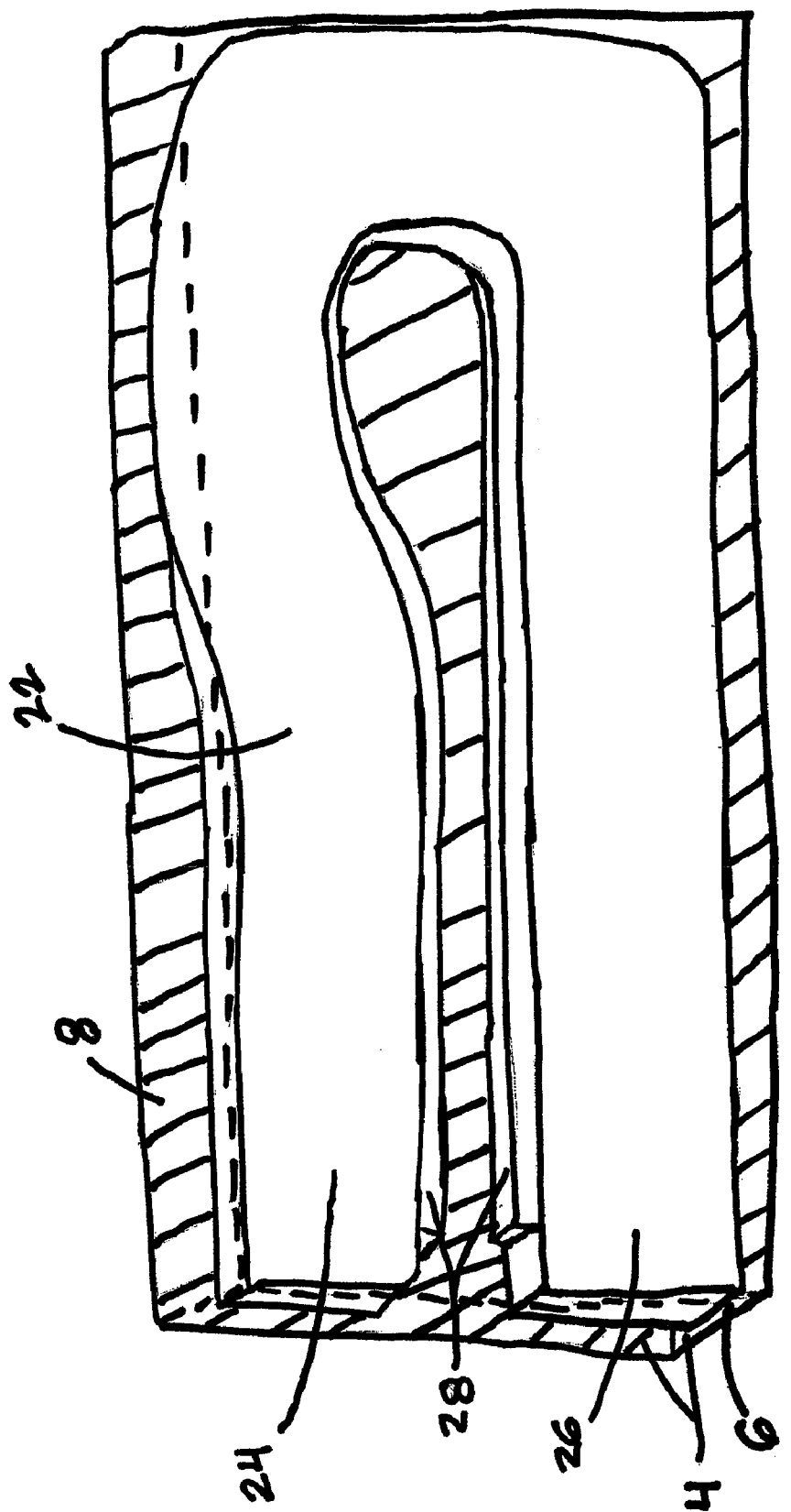
Figure 11:
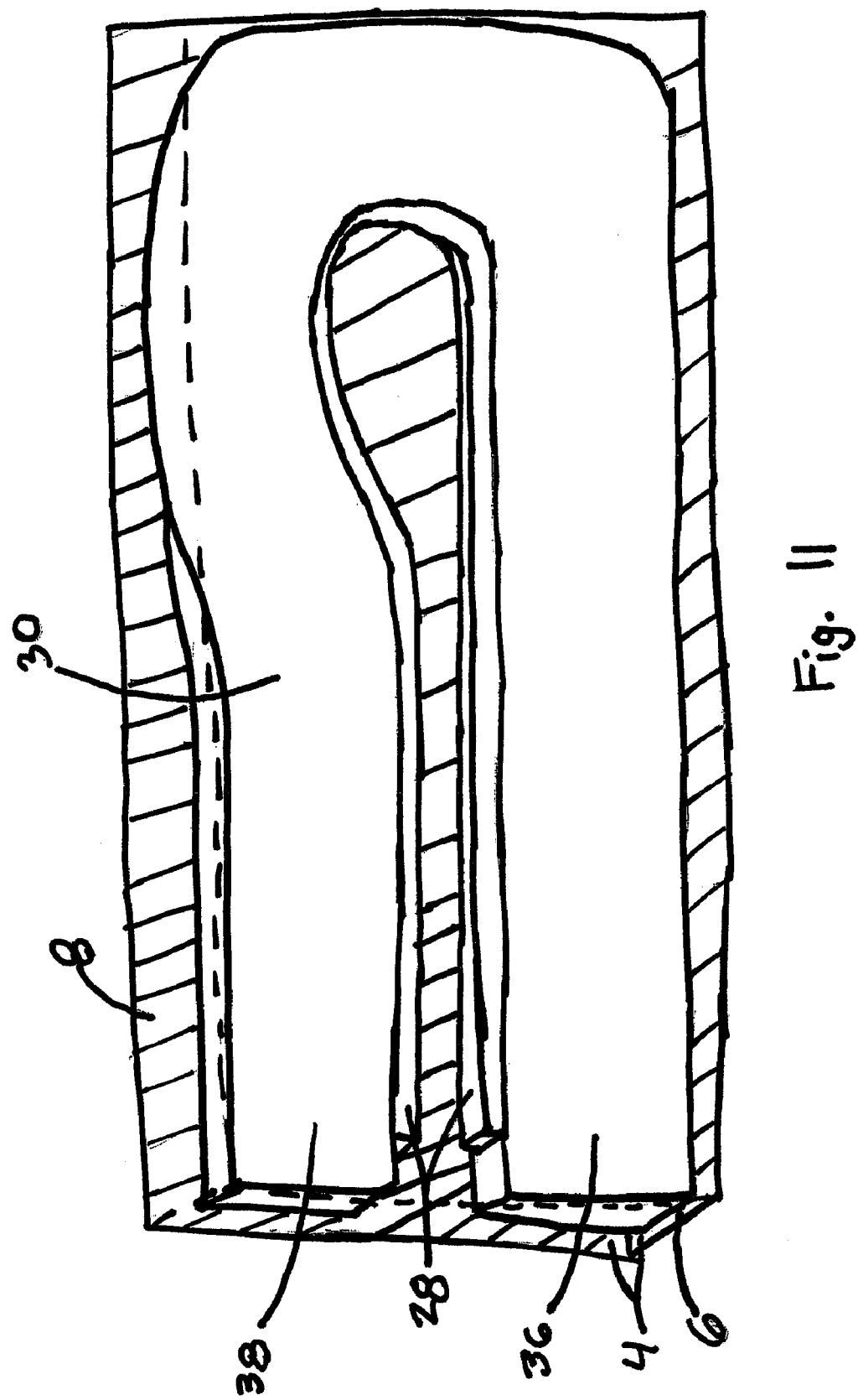
FIG. 11 shows an embodiment in which a power supply chain is folded in the distribution trough.

It is also possible to repeat the arrangement with every $n^{th}$ chain link, at n>3, or with every other chain link, as shown in FIG. 8 and FIG. 9a, b. If a chain link of the upper stringer 38 is suspended above a chain link of the lower stringer 36, with the same arrangement of the elevations 28a (FIG. 9a), the horizontal components of the magnetic forces cancel one another out. If a chain link of the upper stringer 38 is suspended above a chain link of the lower stringer 36 having a complementary arrangement of the elevations 28a, 28b (FIG. 9b), the horizontal components of the magnetic forces also cancel one another out and furthermore result in automatic equalization of minor lateral deflections of the upper stringer 38 relative to the lower stringer 36.

In summary, the following should be stated:

The invention relates to a device for guiding at least one line 2, particularly an electrical line. The device has a distribution trough 4 for laying down the line 2, whereby the distribution trough 4 has a distribution surface 6 and lateral guides 8. According to the invention, it is provided that at least one magnet 12, 16, 28 is guided with the line 2, by means of which magnet it can be held suspended in the distribution trough 4, at least over part of its length.

The invention claimed is:

1. A distribution device comprising:
   (a) at least one line;
   (b) a distribution trough for receiving the at least one line, said distribution trough having a distribution surface and lateral guides; and
   (c) at least one magnet guided with the at least one line
   wherein the at least one line is folded in the distribution trough, in such a manner that a first section of the line has a lower side that faces the distribution surface, above an upper side, that faces away from the distribution surface, of a second section of the line connected with the first section of the line via a bent section;
   and wherein the said at least one magnet is guided on the lower side of the first section and the upper-side of the second section so that a magnetic pole of the at least one magnet on the first section faces a similarly named pole of the at least one magnet on the second section so that the first section of the line is held at least over a part of its length suspended above the second section of the line.

2. The device according to claim 1, wherein the at least one magnet further comprises at least one lateral magnet guided with the line facing the lateral guides, and wherein the lateral guides have at least one lateral-guide magnet, in each instance, which is disposed in such a manner that it repels the lateral magnet as it approaches.

3. The device according to claim 2, wherein the at least one lateral-guide magnet comprises several lateral-guide magnets disposed along the lateral guides, each of said lateral-guide magnets being disposed at a distance from another of said lateral-guide magnets, and the at least one magnet comprises several lateral magnets disposed along the sides of the line that face the lateral guides, each of said lateral magnets being disposed at a distance from another of said lateral magnets, in such a manner that magnetic poles of the lateral-guide magnets face similarly named magnetic poles of the lateral magnets.

4. The device according to claim 3, wherein the lateral-guide magnets are disposed on each of said lateral guides in first and second rows, the first row extending at a distance above the second row.

5. The device according to claim 1, wherein the at least one magnet comprises several upper-side magnets disposed along the first and the second sections, at a distance from one another, in such a manner that magnetic poles along the first section face similarly named magnetic poles along the second section.

6. The device according to claim 1, wherein the at least one magnet comprises at least one member selected from the group consisting of lower-side magnets, lateral magnets and upper-side magnets disposed on the line.

7. The device according to claim 1, wherein the at least one magnet comprises at least one member selected from the group consisting of lower-side magnets, lateral magnets and upper-side magnets and the line is disposed in a carrier that carries said at least one member.

8. The device according to claim 7, wherein said at least one member is disposed on an outer surface of the carrier.

9. The device according to claim 7, wherein said at least one member is disposed in the carrier.

10. The device according to claim 7, wherein said at least one member is disposed in accommodation openings in an outer surface of the carrier.

11. The device according to claim 7, wherein the carrier is a sheath that encloses the line.

12. The device according to claim 7, wherein the carrier is a plastic mass in which several lines are embedded.

13. The device according to claim 7, wherein the carrier is a power supply chain.

14. The device according to claim 1, wherein the distribution trough is made of a non-magnetic material.

15. The device according to claim 1, further comprising at least one member selected from the group consisting of lateral-guide magnets, distribution-surface magnets and slide rail magnets disposed on the surface of the distribution trough.

16. The device according to claim 1, further comprising at least one member selected from the group consisting of lateral-guide magnets, distribution-surface magnets and slide rail magnets inserted into openings in the distribution trough.

17. The device according to claim 1, further comprising at least one first member selected from the group consisting of lateral-guide magnets, distribution-surface magnets and slide rail magnets, wherein the at least one magnet guided by the at least one line comprises at least one second member selected from the group consisting of lateral magnets, lower-side magnets and upper-side magnets and at least one of said at least one first member and said at least one second member are permanent magnets.

18. The device according to claim 1, further comprising at least one first member selected from the group consisting of lateral-guide magnets, distribution-surface magnets and slide rail magnets, wherein the at least one magnet guided by the at least one line comprises at least one second member selected from the group consisting of lateral magnets, lower-side magnets and upper-side magnets and at least one of said at least one first member and said at least one second member are electromagnets.

19. A distribution device comprising:
(a) a power supply chain comprising at least one magnet; and
(b) a distribution trough for receiving the power supply chain, said distribution trough having a distribution surface and lateral guides;
wherein the power supply chain is folded in the distribution trough, in such a manner that an upper stringer of the power supply chain has a lower side that faces the distribution surface, above an upper side, that faces away from the distribution surface, of a lower stringer of the power supply chain; and
wherein the said at least one magnet is guided on the lower side of the upper stringer and on the upper-side of the lower stringer so that a magnetic pole of the at least one magnet on the upper stringer faces a similarly named pole of the at least one magnet on the lower stringer so that the upper stringer of the power supply chain is held at least over a part of its length suspended above the lower stringer of the power supply chain.

20. The device according to claim 19, wherein the at least one magnet of the power supply chain comprises several upper-side magnets disposed on the lower side of the upper stringer of the power supply chain and on the upper side of the lower stringer of the power supply chain, each of said upper-side magnets being disposed at a distance from another of said upper-side magnets, in such a manner that magnetic poles on the upper stringer face similarly named magnetic poles on the lower stringer.

21. The device according to claim 19, wherein the at least one magnet of the power supply chain further comprises at least one lower-side magnet on a lower side of the power supply chain, facing the distribution surface, and wherein the distribution surface has at least one distribution surface magnet, which is disposed in such a manner that it repels the lower side magnet of the power supply chain as it approaches.

22. The device according to claim 21, wherein the at least one magnet of the power supply chain comprises several lower-side magnets disposed along the lower side, each of said lower-side magnets being disposed at a distance from another of said lower-side magnets, and the at least one distribution surface magnet comprises several distribution surface magnets disposed on the distribution surface, each of said distribution surface magnets being disposed at a distance from another of said distribution surface magnets, in such a manner that magnetic poles on the lower side face similarly named magnetic poles on the distribution surface.

23. The device according to claim 19, wherein the at least one magnet of the power supply chain comprises at least one lateral magnet on sides of the power supply chain facing the lateral guides, and wherein the lateral guides have at least one lateral-guide magnet, in each instance, which is disposed in such a manner that a magnetic pole of the lateral guide magnet faces a similarly named magnetic pole of the lateral magnet.

24. The device according to claim 23, wherein the at least one lateral magnet of the power supply chain comprises several lateral magnets disposed along the power supply chain, each of said lateral magnets being disposed at a distance from another of said lateral magnets, and the at least one lateral-guide magnet comprises several lateral-guide magnets disposed along the lateral guides, each of said lateral-guide magnets being disposed at a distance from another of said lateral-guide magnets, in each instance, in such a manner that magnetic poles of the lateral magnets face similarly named magnetic poles of the lateral-guide magnets.

25. The device according to claim 24, wherein the lateral-guide magnets are disposed in first and second rows, the first row extending at a distance above the second row.

26. The device according to claim 19, further comprising at least one first upper-side magnet on the upper side of its lower stringer and at least one second upper-side magnet on the lower side of its upper stringer, whereby a magnetic pole on the lower stringer faces a similarly named magnetic pole on the upper stringer.

27. The device according to claim 26, wherein the at least one upper side magnet comprises several upper-side magnets disposed on the upper side of its lower stringer and on the lower side of its upper stringer, in each instance, in such a manner that magnetic poles on the upper stringer face similarly named magnetic poles on the lower stringer.

28. The device according to claim 26, wherein said at least one member is disposed on the connection crosspieces that connect the lateral links.

29. The device according to claim 26, wherein said at least one member is disposed on lateral links of the power supply chain.

30. The device according to claim 26, wherein the power supply chain comprises a plurality of chain links and the at least one upper-side magnet comprises a pair of upper-side magnets disposed on each of said chain links, symmetrical to the center longitudinal plane, extending on both sides in the longitudinal direction of the respective chain link.

31. The device according to claim 30, wherein each upper-side magnet has an elevation that extends in a longitudinal direction and points away from the respective chain link.

32. The device according to claim 31, wherein the elevations of the upper-side magnets of consecutive said chain links are disposed at different distances from their sides.

33. The device according to claim 32, wherein in the case of each of said chain links, each elevation is disposed as in the case of an nth subsequent chain link, whereby n is a natural number.

34. The device according to claim 33, wherein n is greater than or equal to 3.

35. The device according to claim 26, further comprising rollers that roll along the lateral guides on sides facing the lateral guides of the distribution trough.

36. The device according to claim 19, further comprising at least one member selected from the group consisting of at least one lower-side magnet on its lower side and at least one lateral magnet on the lateral surfaces of the chain links.

37. The device according to claim 36, wherein the at least one member comprises at least one lateral magnet disposed on its lateral links.

38. A distribution device comprising:
(a) at least one line;
(b) a distribution trough for receiving the at least one line, said distribution trough having a distribution surface and lateral guides; and
(c) at least one magnet guided with the at least one line;
wherein the at least one magnet guided with the at least one line faces the distribution surface; and
wherein the distribution surface has at least one distribution-surface magnet that repels the at least one magnet guided with the line so that the line is held at least over a part of its length suspended above the distribution surface.

39. The device according to claim 38, wherein the at least one magnet comprises several lower-side magnets disposed along the line, each of said lower side magnets being disposed at a distance from another of said lower side magnets, and the at least one distribution-surface magnet comprises several distribution-surface magnets disposed on the distribution surface, each of said distribution-surface magnets being disposed at a distance from another of said distribution-surface magnets, in such a manner that magnetic poles along the line face similarly named magnetic poles on the distribution surface.

40. A distribution device comprising:
(a) a power supply chain comprising at least one magnet;
(b) a distribution trough for receiving the at least one power supply chain, said distribution trough having a distribution surface and lateral guides; and
wherein the at least one magnet of the power supply chain faces the distribution surface; and
wherein the distribution trough has at least one distribution-trough magnet that repels the at least one magnet of the power supply chain so that the power supply chain is held at least over a part of its length suspended above the distribution trough.

41. The device according to claim 40, wherein the distribution trough has a slide rail for laying down an upper stringer of the power supply chain, wherein the distribution trough magnet comprises at least one slide-rail magnet disposed on the slide rail, and wherein the at least one magnet of the power supply chain comprises at least one upper-side magnet disposed on the lower side of the upper stringer that faces the slide rail, in such a manner that a magnetic pole of the upper-side magnet faces a similarly named magnetic pole of the slide-rail magnet.

42. The device according to claim 41, wherein the at least one magnet of the power supply chain comprises several upper-side magnets disposed on the power supply chain, each of said upper-side magnets being disposed at a distance from another of said upper-side magnets, and the at least one slide-rail magnet comprises several slide-rail magnets disposed on the slide rail, each of said slide-rail magnets being disposed at a distance from another of said slide-rail magnets, in such a manner that magnetic poles of the upper-side magnets face similarly named magnetic poles of the slide-rail magnets.

* * * * *